United States Patent
Yoo et al.

(10) Patent No.: US 7,836,509 B2
(45) Date of Patent: Nov. 16, 2010

(54) RECORDING MEDIUM, APPARATUS FOR REPRODUCING DATA AND METHOD THEREOF

(75) Inventors: Jea Yong Yoo, Seongnam-si (KR); Wae Yeul Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 889 days.

(21) Appl. No.: 11/648,811

(22) Filed: Jan. 3, 2007

(65) Prior Publication Data

US 2007/0162712 A1    Jul. 12, 2007

Related U.S. Application Data

(60) Provisional application No. 60/757,003, filed on Jan. 9, 2006.

(30) Foreign Application Priority Data

Apr. 18, 2006    (KR) .................. 10-2006-0034954

(51) Int. Cl.
*H04L 9/32* (2006.01)
(52) U.S. Cl. .................. 726/26; 726/27
(58) Field of Classification Search .......... 726/26–27, 726/30–33; 380/200–203; 713/189, 192–194; 705/50–51, 57–59
See application file for complete search history.

(56) References Cited

U.S. PATENT DOCUMENTS

| | | | |
|---|---|---|---|
| 6,034,832 A | * | 3/2000 | Ichimura et al. .............. 360/60 |
| 6,631,359 B1 | | 10/2003 | Braitberg et al. |
| 2002/0181339 A1 | | 12/2002 | Denda et al. |
| 2004/0158768 A1 | | 8/2004 | Park et al. |
| 2005/0117480 A1 | | 6/2005 | Yun |
| 2005/0184700 A1 | | 8/2005 | Fujimura |
| 2005/0281167 A1 | | 12/2005 | Park |
| 2007/0033147 A1 | | 2/2007 | Kaburagi |
| 2008/0075437 A1 | | 3/2008 | Hamada et al. |
| 2008/0145026 A1 | | 6/2008 | Shimada et al. |

FOREIGN PATENT DOCUMENTS

| | | |
|---|---|---|
| CN | 1529316 | 9/2004 |
| JP | 2000-187941 | 7/2000 |
| JP | 2004-272341 | 9/2004 |
| JP | 2006-040500 | 2/2006 |
| WO | WO 03/085664 | 10/2003 |

OTHER PUBLICATIONS

Office Action for corresponding U.S. Appl. No. 11/648,810 dated Jun. 25, 2010.
International Search Report dated Jun. 6, 2007.
Office Action for corresponding Chinese Application 200680050773.4 dated Sep. 17, 2010 and English translation thereof.

\* cited by examiner

*Primary Examiner*—Hosuk Song
(74) *Attorney, Agent, or Firm*—Harness, Dickey & Pierce

(57) ABSTRACT

In one embodiment, the recording medium includes a management area storing management information. The management information includes navigation information for reproducing data from the recording medium, and the navigation information including region information. The region information indicates at least one geographic region in which reproduction of the data is permitted.

16 Claims, 13 Drawing Sheets

FIG. 4

| command_id | Navigation Commands | Comments |
|---|---|---|
| 0 | A | Compare PSR(k) with the region code |
| 1 | B | Display a warning message if the PSR(k) is not identical with the region code |
| 2 | C | Playback a title to designated by user |

FIG. 5

"It is not possible to playback the contents"
"You need a certification (region code)"

FIG. 6

| command_id | Navigation Commands | Comments |
|---|---|---|
| 0 | A | Compare PSR(k) with the region code |
| 1 | T | Compare a local date with the region free date |
| ⋮ | ⋮ | ⋮ |
| n-1 | B | Display a warning message if the PSR(k) is not identical with the region code |
| n | C | Playback a title to designated by user |

FIG. 7

| PSR number | Name | Meaning | type(Note1) |
|---|---|---|---|
| ⋮ | ⋮ | ⋮ | ⋮ |
| k | Region | Region Code | Player Setting |
| k+1 | – | – | – |

FIG. 8

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| Local_date | | | | | | | |

| b7 | b6 | b5 | b4 | b3 | b2 | b1 | b0 |
|---|---|---|---|---|---|---|---|
| Region Code | | | | | | | |

FIG. 13

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| 2006-04-18 06:00:00 AM | | | | | | | |

| b7 | b6 | b5 | b4 | b3 | b2 | b1 | b0 |
|---|---|---|---|---|---|---|---|
| Region Code | | | | | | | |

RECORDING MEDIUM, APPARATUS FOR REPRODUCING DATA AND METHOD THEREOF

DOMESTIC PRIORITY INFORMATION

This application claims the benefit of U.S. Provisional Application No. 60/757,003, filed on Jan. 9, 2006, which is hereby incorporated by reference as if fully set forth herein.

FOREIGN PRIORITY INFORMATION

This application claims the benefit of the Korean Patent Application No. 10-2006-0034954, filed on Apr. 18, 2006, which is hereby incorporated by reference as if fully set forth herein.

BACKGROUND OF THE INVENTION

1. Field of the Invention

The present invention relates to data reproduction, and more particularly, to a recording medium, apparatus for reproducing data and method thereof. Although the present invention is suitable for a wide scope of applications, it is particularly suitable for preventing unauthorized contents distribution.

2. Discussion of the Related Art

Recently, various contents including movies, dramas, music, software and the like are marketed/distributed as stored in such an optical recording medium such as a CD (compact disc), DVD (digital video disc), etc. For instance, DVDs having memory capacity enough to store a movie are useful as a medium for movie sales.

However, contents may be illegally copied or distributed without approval despite that a proprietor's copyright of the content stored in this recording medium should be protected. In particular, even if contents distribution to a specific region or country needs to be restricted, the corresponding content may be distributed rapidly through various paths. Hence, the corresponding proprietor's copyright may not be protected.

SUMMARY OF THE INVENTION

The present invention relates to a recording medium having a data structure for managing reproduction of data from the recording medium.

In one embodiment, the recording medium includes a management area storing management information. The management information includes navigation information for reproducing data from the recording medium, and the navigation information including region information. The region information indicates at least one geographic region in which reproduction of the data is permitted.

For example, the navigation information may include at least one command object instructing playback of data, and the command object may include the region information for the data associated with the playback instruction.

In one embodiment, each command object prohibits playback of the data if the region information in the command object does not match the region information in the reproducing apparatus.

The present invention also relates to a method of reproducing data from a recording medium.

In one embodiment, the method includes reproducing, using a reproducing apparatus, at least one navigation command object from the recording medium. The navigation command object includes region information and an instruction. The instruction instructs to playback data from the recording medium, and the reproduced region information indicates at least one geographic region in which reproduction of the data is permitted. The data is reproduced as instructed by the instruction if the reproduced region information matches region information stored in the reproducing apparatus.

In another embodiment of the method, a reproducing apparatus is permitted to reproduce data from the recording medium if region information stored in the reproducing apparatus matches region information recorded in a command object on the recording medium. The command object indicates data to reproduce from the recording medium.

The present invention further relates to an apparatus for reproducing data from a recording medium.

In one embodiment, the apparatus includes a pick-up unit configured to reproduce information from the recording medium, and a memory storing region information indicating a geographic region. A control unit is configured to control the pick-up unit to reproduce at least one navigation command object from the recording medium. The navigation command object includes region information and an instruction. The instruction instructs to playback data from the recording medium, and the reproduced region information indicates at least one geographic region in which reproduction of the data is permitted. The control unit is also configured to control the pick-up unit to reproduce the data as instructed by the instruction if the reproduced region information matches stored region information.

The present invention still further relates to methods and apparatuses for recording management data in a recording medium.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram of a navigation command according to one embodiment of the present invention;

FIG. 5 is a diagram of a navigation command according to another embodiment of the present invention;

FIG. 6 is a diagram of a navigation command according to a further embodiment of the present invention;

FIG. 7 is a diagram of device registration information recorded in a data record/reproduction apparatus according to one embodiment of the present invention;

FIG. 8 is a diagram of device registration information including region information according to one embodiment of the present invention;

FIG. 13 is a diagram of device registration information according to another embodiment of the present invention.

DETAILED DESCRIPTION OF THE EXAMPLE EMBODIMENTS

Reference will now be made in detail to example embodiments of the present invention, which are illustrated in the accompanying drawings. Wherever possible, the same reference numbers will be used throughout the drawings to refer to the same or like parts.

First Embodiment

Figure 1:
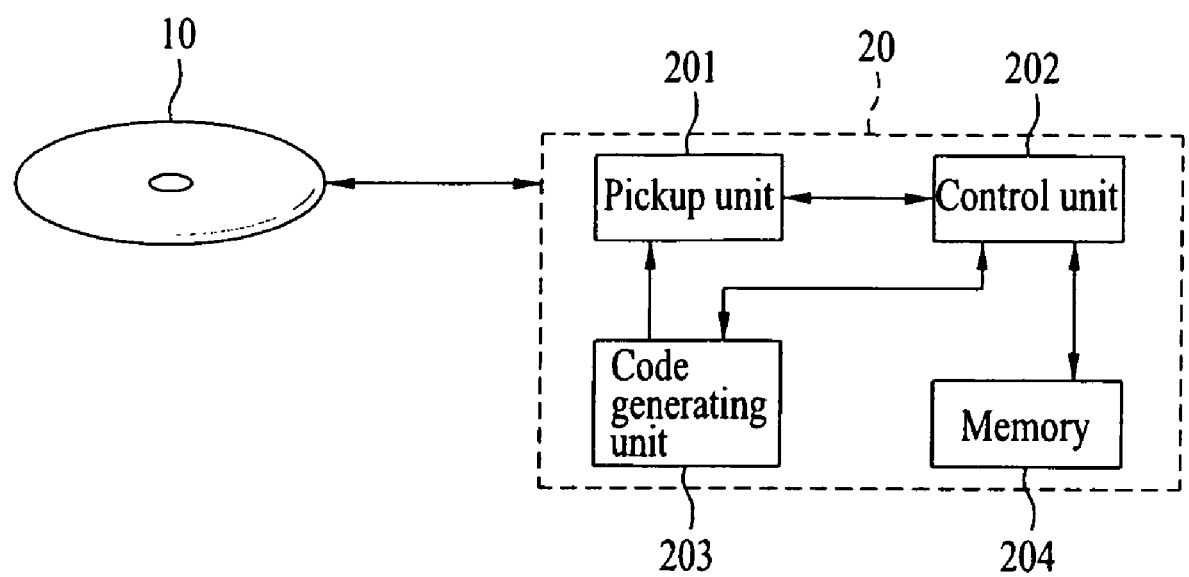
FIG. 1 is a block diagram of a data record/reproduction system according to a first embodiment of the present invention.

FIG. 1 is a block diagram of a data record/reproduction system according to a first embodiment of the present invention.

Referring to FIG. 1, a recording medium 10 according to the present invention may be an optical recording medium such as a CD (compact disc), a DVD (digital versatile disc), a BD (Blu-ray disc) and the like or another recording medium capable of data record/reproduction. In this case, reproduction means an operation of reading stored data and also includes the execution of a stored computer program, an output of stored data, a copy of the stored data and the like.

Figure 2:
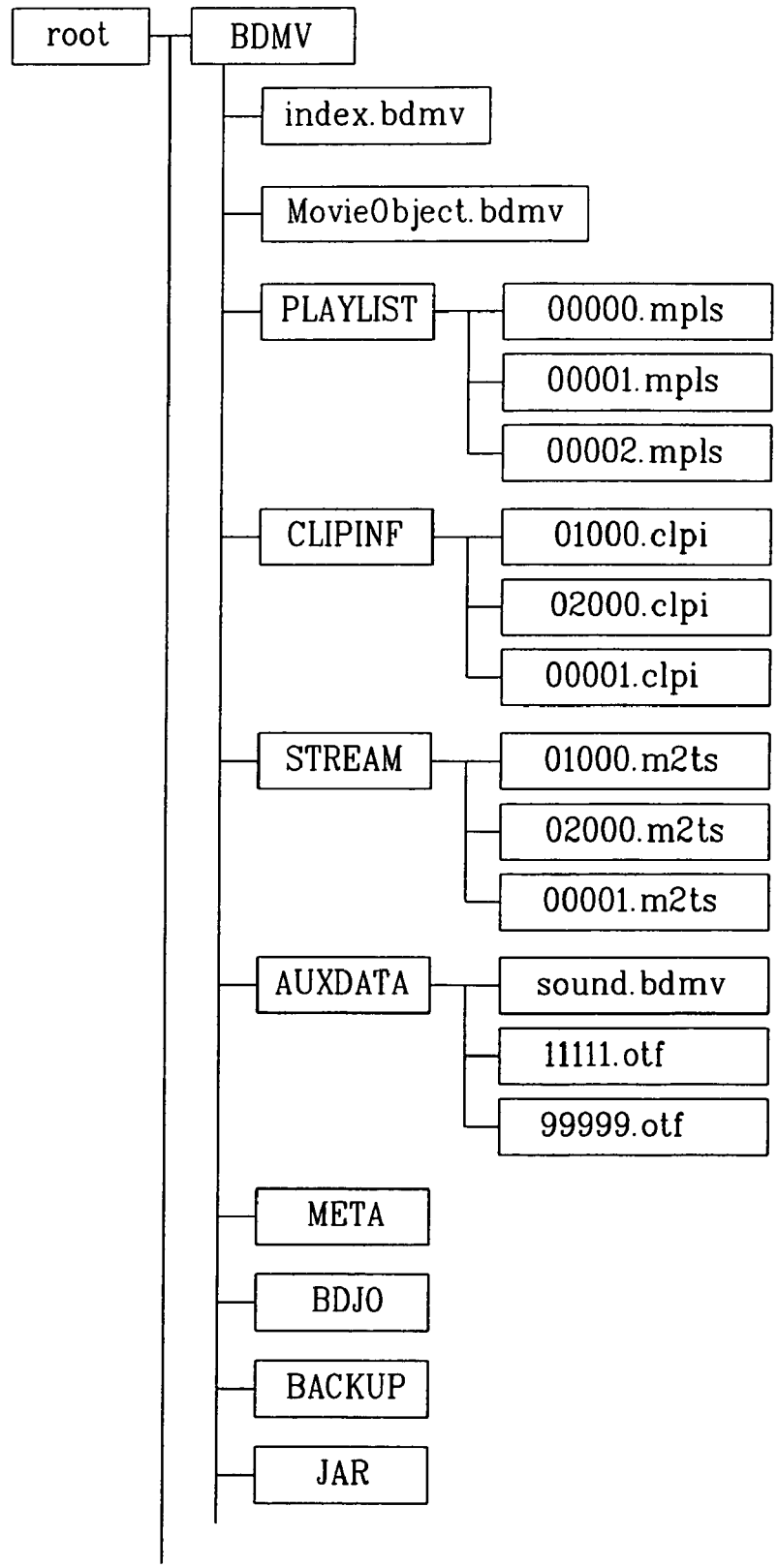
FIG. 2 is a diagram of a file structure for reproduction management of data within a recording medium according to an embodiment of the present invention.

FIG. 2 is a diagram of a file structure for reproduction management of data within a recording medium according to an embodiment of the present invention.

Referring to FIG. 2, in a file structure according to the present invention, at least one BDMV directory exists below one root directory. An index file ("index") and an object file ("MovieObject") as general file (higher file) information to secure interactivity with a user exist within the BDMV directory. And, the BDMV directory, which has information of data actually recorded within a disc and information about a method of reproducing the recorded data, is provided with a playlist directory PLAYLIST, a clipinfo directory CLIPINF, a stream directory STREAM, an auxiliary directory AUXDATA, a BD-J object directory BDJO, a metadata directory META and a backup directory BACKUP.

These directories and files included in each of the directories are explained in detail as follows.

Figure 3:
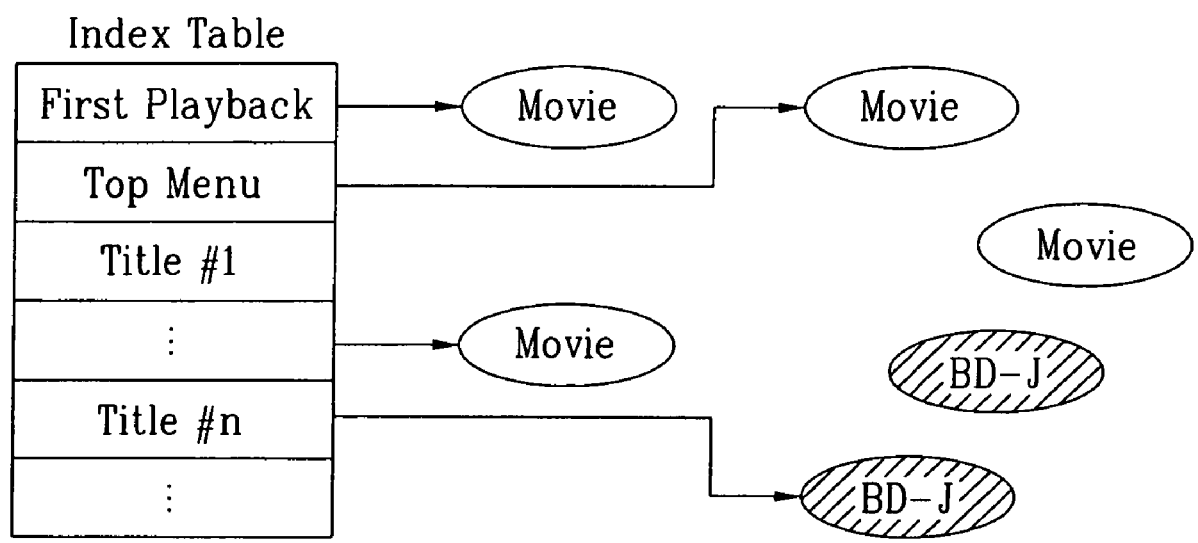
FIG. 3 is a diagram for explaining a relation between index and object files according to an embodiment of the present invention.

FIG. 3 is a diagram for explaining a relation between index and object files. In the present invention, "Title" used in the following description means generally used contents. In the present system, a user selects a playback by a title unit through an index.

Referring to FIG. 3, each title is linked to a specific object. And, a stream associated with the corresponding title recorded within a disc is reproduced according to a command for controlling a reproduction method based on a condition such as a viewing rate restriction (parental control), a playlist control and the like or a program within the object. For instance, a motion picture is executed by a navigation command within the object or a Java application. In particular, for explanation convenience of the present invention, a title having moving picture, movie and interactive information to be executed by the MovieObject among titles recorded within a disc shall be named "HDMV Title". And, a title having moving picture, movie and interactive information executed by a Java program among titles recorded within a disc shall be named "BD-J Title".

The metadata directory META includes a metadata file as data about a data. Namely, in the metadata directory META, a search file, a metadata file for Disc Library and the like exist as the metadata files to use for efficient search or management of data on the disc.

The BD-J object directory BDJO includes a BD-J Object file for reproducing a BD-J Title.

The auxiliary directory AUXDATA includes auxiliary files containing information required for a disc playback. For instance, the AUXDATA directory can include a sound file ("Sound.bdmv") providing click sound in case of an execution of interactive graphic and a font file ("1111.otf") providing font information in case of a text subtitle.

In the stream directory STREAM, AV stream files recorded within a disc in a specific format exist, the streams are recorded as an MPEG-2 transport packets in general, and ".m2ts" is used as an extension of a stream file (01000.m2ts, 02000.m2ts). In particular, a stream generated from multiplexing audio, video and graphic information together is named an A/V stream and at least one or more A/V stream files form a title.

The clipinfo directory CLIPINF includes clip information files (01000.clpi, 02000.clpi) having a one-to-one correspondence to the stream files, respectively. In particular, the clip information file ("*.clpi") includes attribute information and timing information of the corresponding stream file. In particular, the stream file ("*.m2ts") and the clip information file ("*.clpi") corresponding to the stream file (*.m2ts) by one-to-one are collectively named a "clip". Namely, a "clip" is the data containing both of the stream file ("*.m2ts") and the clip information file ("*.clpi").

The playlist directory PLAYLIST includes playlist files ("*00000.mpls"). Playlist means a set of playing intervals for reproducing clips. And, the playing interval is called a PlayItem. Each of the playlist files ("*00000.mpls") includes at least one PlayItem and SubPlayItem (SPI) designating a playing interval of reproducing a specific clip. The PlayItem and SubPlayItem (SPI) have information about a reproduction start time (IN-Time) and reproduction end time (OUT-Time) of a specific clip. So, the playlist can be called a set of PlayItems.

And, the backup directory BACKUP stores a copy of all general information files (e.g., files of index file "index" recording information associated with a disc playback among data of the file structure, object files such as "MovieObject" and "BD-J Object", unit key file); all playlist files ("*.mpls") within the playlist directory PLAYLIST; and all clip information files ("*.clpi") within the clipinfo directory CLIPINF. Since the loss of the files is fatal to the disc playback, the BACKUP directory stores these files for backup.

The recording medium 10 according to the present invention includes at least one regional code indicating a region or country enabling a playback (reproduction) of data stored therein.

The regional code is used in restricting a reproduction of entire data of the recording medium or a reproduction per title (or contents). The regional code is recorded in the index file shown in FIG. 2 to restrict the reproduction of the entire data or is recorded in the object file (MovieObject) shown in FIG. 3 to restrict per title reproduction.

The data record/reproduction apparatus 20 according to the present invention is provided with regional information indicating a designated region or country. The regional information is recorded as device registration information indicating various parameter values and status/conditions of the data record/reproduction apparatus 20.

FIG. 7 shows PSRs (player status registers) of a BD-ROM record player as an example of the device registration information. The regional information, as shown in FIG. 7, can be recorded in a PSR of No. k. And, the regional information, as shown in FIG. 8, represents the designated region or country using 8 bits (b0~b7) in the 32-bit PSR. For instance, if the designated region is the American continent, the regional information can be represented as 0000 0001b. If the designated region is Africa and Europe, the regional information can be represented as 0000 0010b. If the designated region is Asia, the regional information can be represented as 0000 0100b. Besides, the regional information can be defined by being divided into local information and country information.

A field for storing a local date to be compared to regional code limited time information (region free date) can be additionally defined in 8 bits (b8~b15) of the PSR.

The regional code limited time information (region free date) indicates a time for restricting reproduction of data to a region or country, a time for permitting the reproduction and the like. Also, regional code limited time information can be further included in the recording medium 10 together with regional information.

The regional code limited time information (region free date) is represented as a plurality of bits to express a restriction start/end date or a permission (release) start/end date, and can include restriction and permission dates differently set according to each region or country. The regional code limited time information (region free date) can be included in the index table or object file like the regional code.

The data record/reproduction apparatus 20 compares the regional information to the regional code recorded in the recording medium 10 and decides whether a regional code corresponding to the designated region or country exists in the recording medium 10.

According to a result of the decision, the data record/reproduction apparatus 20 performs a user-specific operation or displays a warning message.

The data record/reproduction apparatus 20 decides whether a restriction for a non-permitted region or country is released based on the fixed-date information stored in the recording medium 10. If the restriction is released, the data record/reproduction apparatus 20 performs a user-specific operation despite the non-permitted region or country.

The data record/reproduction apparatus 20 shown in FIG. 1 is just exemplary and can be modified into various configurations and forms.

The data record/reproduction apparatus 20 includes a pickup unit 201, a control unit 202, a code generating unit 203 and a memory 204.

The pickup unit 201 reads the regional code recorded in the recording medium 10 and then provides the read regional code to the control unit 202. The pickup unit 201 reads data stored in the recording medium 10 according to a command of the control unit 202 or records data in the recording medium 10.

The control unit 202 decides whether the data of the recording medium 10 is reproducible based on the regional code read by the pickup unit 201.

In case of copying the data of the recording medium 10, the code generating unit 203 generates a new regional code for the copied data. In this case, the code generating unit 203 can generate a new regional code based on the regional code originally recorded in the recording medium 10 and the regional information recorded in the data record/reproduction apparatus 20. And, the code generating unit 203 can generate/record the new regional code for the entire copied data or each title.

The memory 204 stores the device registration information including the regional information. And, the memory 204 stores the new regional code generated by the code generating unit 203 and information for the copied data having the new regional code inserted therein.

A method of reproducing data in case that a regional code is recorded in an index file of the recording medium 10 according to an embodiment of the present invention is explained as follows.

Figure 9:
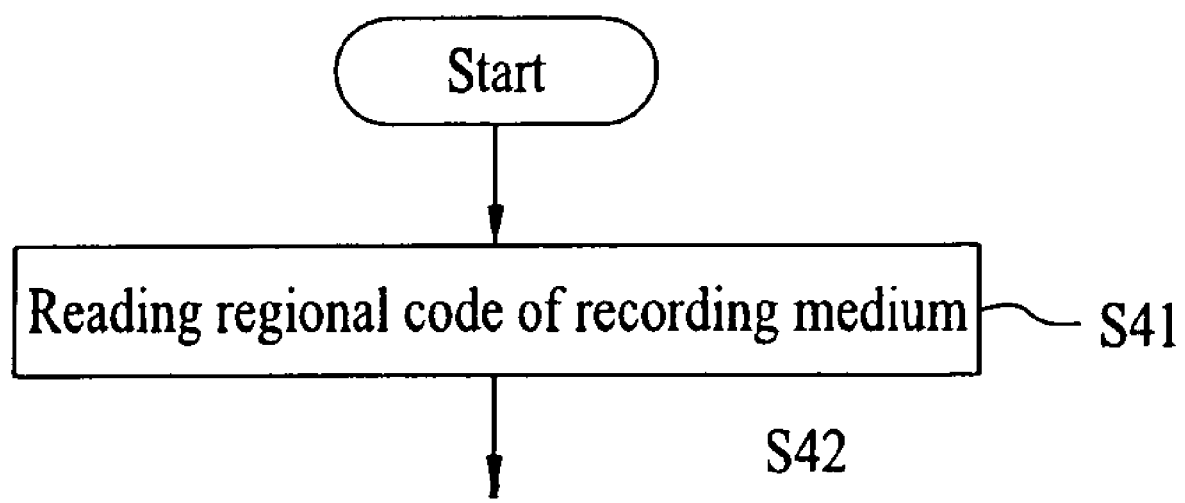
FIG. 9 is a flowchart of a method of reproducing data according to one embodiment of the present invention.

FIG. 9 is a flowchart of a method of reproducing data according to one embodiment of the present invention.

Referring to FIG. 9, once a user's command for instructing a playback is inputted, the pickup unit 201 reads at least one regional code recorded in an index table of the recording medium 10 (S41) and then transfers the read regional code to the control unit 202.

The control unit 202 compares the transferred regional code to regional information stored in the memory 204 to decide whether a regional code in the data record/reproduction apparatus 20 matches the regional code in the recording medium 10 (S42).

If a match exists, the control unit 202 performs the playback or reproduction according to the user's command (S43).

If a match does not exist, the control unit 202 displays a warning message instead of reproducing the data of the recording medium 10 (S45). In this case, the warning message can include a sentence or icon indicating that the user's command is not executable or a sentence or icon indicating that the regions/countries designated to the recording medium and the data record/reproduction apparatus 20 do not match.

Optionally, if the matched regional code does not exist in the recording medium 10, the control unit 202 decides whether the information indicating the fixed-date information for the limited time of a non-permitted region/country exists in the index file of the recording medium 10.

If the fixed-date information does not exist in the recording medium 10, the control unit 202 displayed a warning message.

If the fixed-date information exists in the recording medium 10, the control unit decides whether the limited time corresponding to the region/county designated to the data record/reproduction apparatus 20 has expired based on the fixed-date information (S44). Namely, the recording medium 10 includes a data after which reproduction is permitted regardless of the regional codes in the recording medium 10 and the record/reproduction apparatus 20 match. In this case, the control unit 202 can use a separate date/time secured clock or a Local_date field of PSR 20 to decide whether the corresponding limited time included in the fixed-date information read from the recording medium 10 has expired.

In the date/time secured clock, a user or application program is unable to change a date or time. Instead, a date or time of the date/time secured clock can be set/changed based on official time information carried by a broadcast or GPS signal. In case of the Local_date field, it is updated using the official time information. Since the user or application program is unable to change a date or time of the separate secured clock, the control unit 204 can correctly decide whether the corresponding limited time has expired.

If the limited time has expired, the control unit 202 performs the playback according to the user's command even if a match between regional codes in the recording medium 10 and the record/reproduction apparatus 20 does not exist (S43). If the limited time has not expired, the control unit 202 displays a warning message (S45).

A method of reproducing data in case of a regional code recorded in an object file (MovieObject) of the recording medium 10 according to an embodiment of the present invention is explained as follows.

Figure 10:
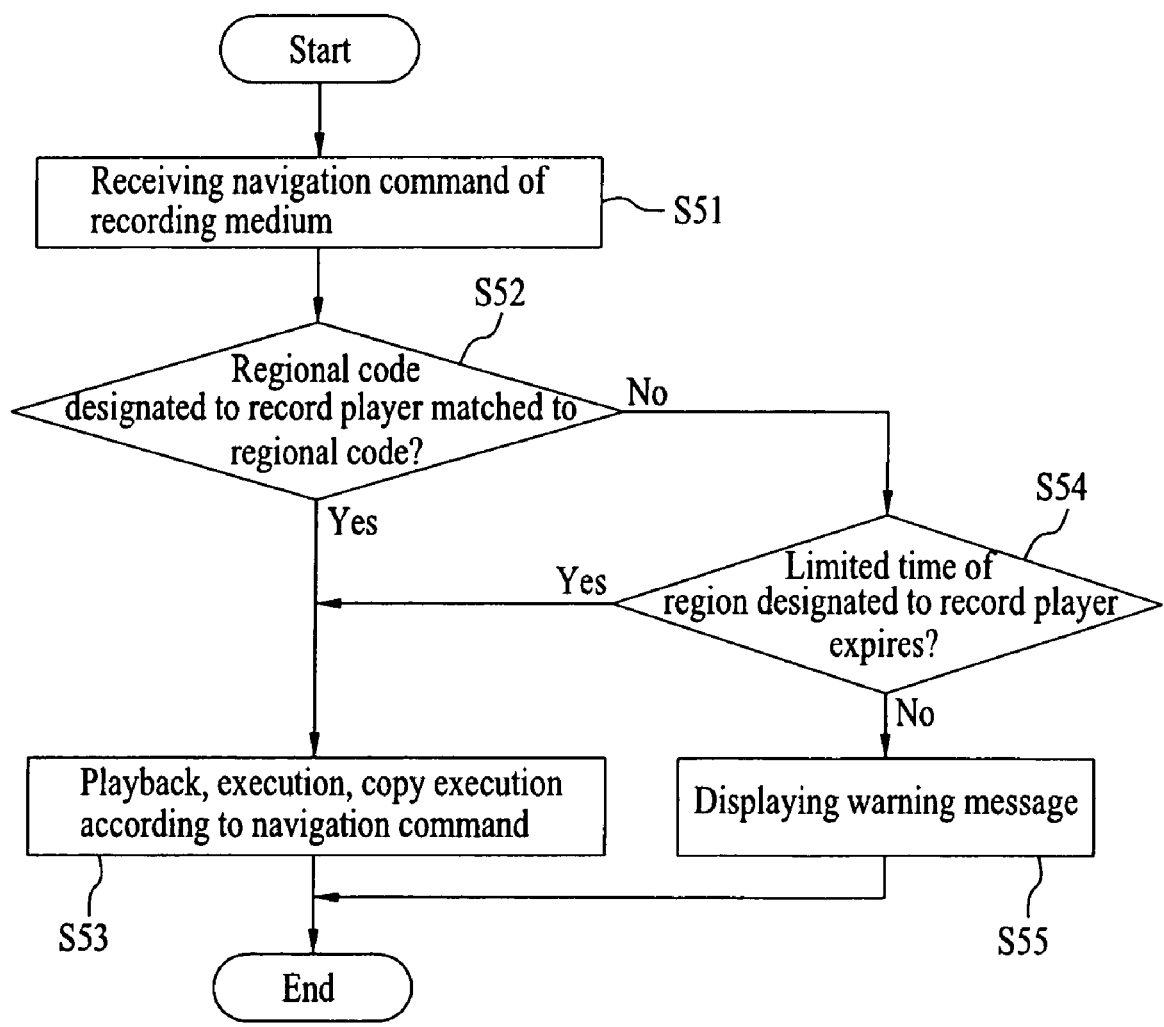
FIG. 10 is a flowchart of a method of reproducing data according to another embodiment of the present invention.

FIG. 10 is a flowchart of a method of reproducing data according to another embodiment of the present invention.

Referring to FIG. 10, if the recording medium 10 is loaded in the data record/reproduction apparatus 20 or if a user's command for instructing a playback (reproduction) is inputted, the pickup unit 201 reads an index to enable a user to select a specific title. Once the specific title is selected, the pickup unit 201 reads a navigation command including a regional code within an object file interconnected with the corresponding title from the recording medium 10 and then transfers it to the control unit 202 (S51).

The object file includes the regional code and the navigation command. The navigation command can include a command for instructing to confirm a region/country assigned to the data record/reproduction apparatus 20 with reference to the $20^{th}$ PSR of the data record/reproduction apparatus 20, a command for instructing to display a warning message instead of playing back a title if the region/country assigned to the data record/reproduction apparatus 20 does not match the regional code in the object file, a command for instructing to play a title if a matched region exists, etc.

The control unit 202 compares at least one regional code included in the received navigation command to region information stored in the memory 204 according to the navigation command, and then decides whether a match exists (S52).

If a match exists, the control unit 202 plays the title according to the navigation command (S53).

On the other hand, if a match does not exist, the control unit 202 displays a warning message according to the navigation command (S55).

FIG. 4 is a diagram of a navigation command according to one embodiment of the present invention.

Referring to FIG. 4, a value of regional information "PSR (k)" recorded in a record/reproduction apparatus 20 and a value of a regional code are compared to each other according to a command "A". If the regional information "PSR(k)" and the regional code are not equal to each other, a warning message is displayed according to a next command "B".

FIG. 5 shows an example of a warning message to be displayed.

Referring to FIG. 5, if the regional information and the regional code do not match, a warning title for displaying the warning message is executed according to the command "B". For instance, as the warning message, a message indicating "It is not possible to playback the contents. You need a certification" or "A regional code of a recording medium does not match" is displayed.

If the regional information and the regional code do match, the command "B" shown in FIG. 4 is not executed, but a next command "C" is executed. For instance, a Playlist to be played in an object file is reproduced.

Optionally, if a match does not exist in the recording medium 10, the control unit 202 decides whether fixed-date information indicating a limited time of a non-permitted region/country exists in the object file (MovieObject). If the fixed-date information does not exist in the object file, the control unit 202 displays the warning message.

If the fixed-date information exists, the control unit 202 decides whether the fixed date provided in the fixed-date information has passed. The former embodiment is applicable to this decision step.

If it is after the fixed date, the control unit 202 performs a playback according to the navigation command even if the regional code included in the object file does not match the region/country of the data record/reproduction apparatus 20 (S53).

If it is not after the fixed date, the control unit 202 displays a warning message according to the navigation command (S55).

FIG. 6 is a diagram of an object file including regional code limited time information (region free date). Information of local_date is read from PSR(k) of FIG. 13 according to a command "T" shown in FIG. 6. And, the regional code limited time information (region free date) (2006-04-31) recorded in the recording medium 10 is compared to the read local_date information of '2006-04-18'. Since the region fixed date has not expired yet, reproduction jumps to a title for a warning message like the example of FIG. 4.

As another embodiment of the present invention, in case that a BD-J object is linked to a title, as shown in FIG. 3, a Java application included in the BD-J object compares a regional code of the corresponding title to regional information of the record/reproduction apparatus 20, and then decides whether to reproduce corresponding data according to a result of the comparison. The Java application may also decide whether a reproduction limited time expires based on fixed-date information recorded in the BD-J object file, and then decide whether to reproduce the corresponding data according to a result of the decision.

The index file includes a plurality of titles and the object file (MovieObject file), which includes a plurality of objects (MovieObject) as shown in FIG. 3. Since each of the titles within the index file is linked to one of a plurality of the objects, a specific title selected by a user becomes linked to the corresponding object. And, the linked object then selects and plays a Playlist to be played back using a command set. Since the object has the command set providing the regional code for comparison to the regional information of the record/reproduction apparatus 20, a title author can set a regional code differently per title.

Second Embodiment

Figure 11:
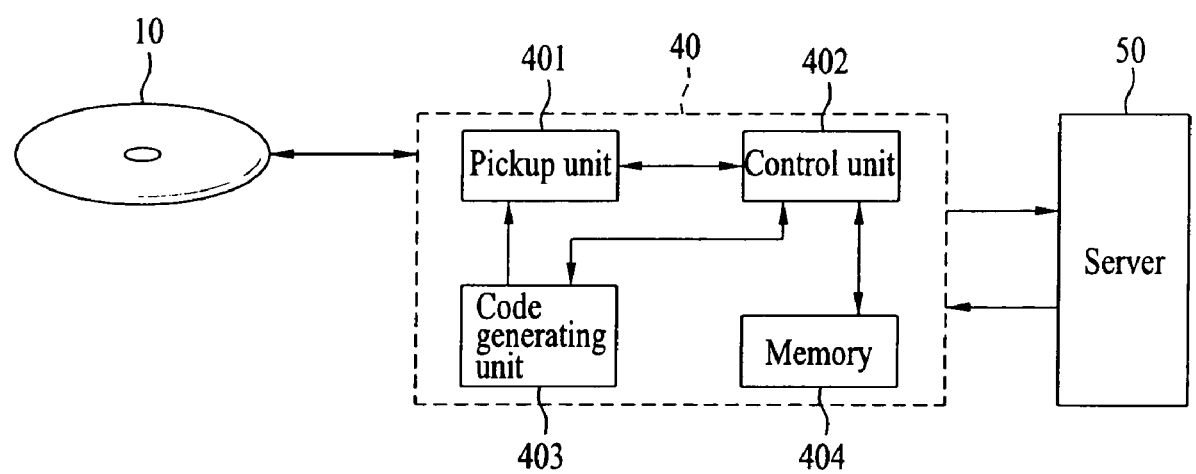
FIG. 11 is a block diagram of a data record/reproduction system according to a second embodiment of the present invention.

FIG. 11 is a block diagram of a data record/reproduction system according to a second embodiment of the present invention, in which elements for explaining the technical idea of the present invention is shown and have been omitted for the sake of clarity.

Referring to FIG. 11, a configuration of a recording medium 10 according to a second embodiment of the present invention is similar to that of the former embodiment of the present invention. And, the data record/reproduction apparatus 40 according to the second embodiment of the present invention differs from that of the former embodiment of the present invention in an operation associated with a server 50 only.

A method of reproducing data according to a second embodiment of the present invention is explained as follows.

Figure 12:
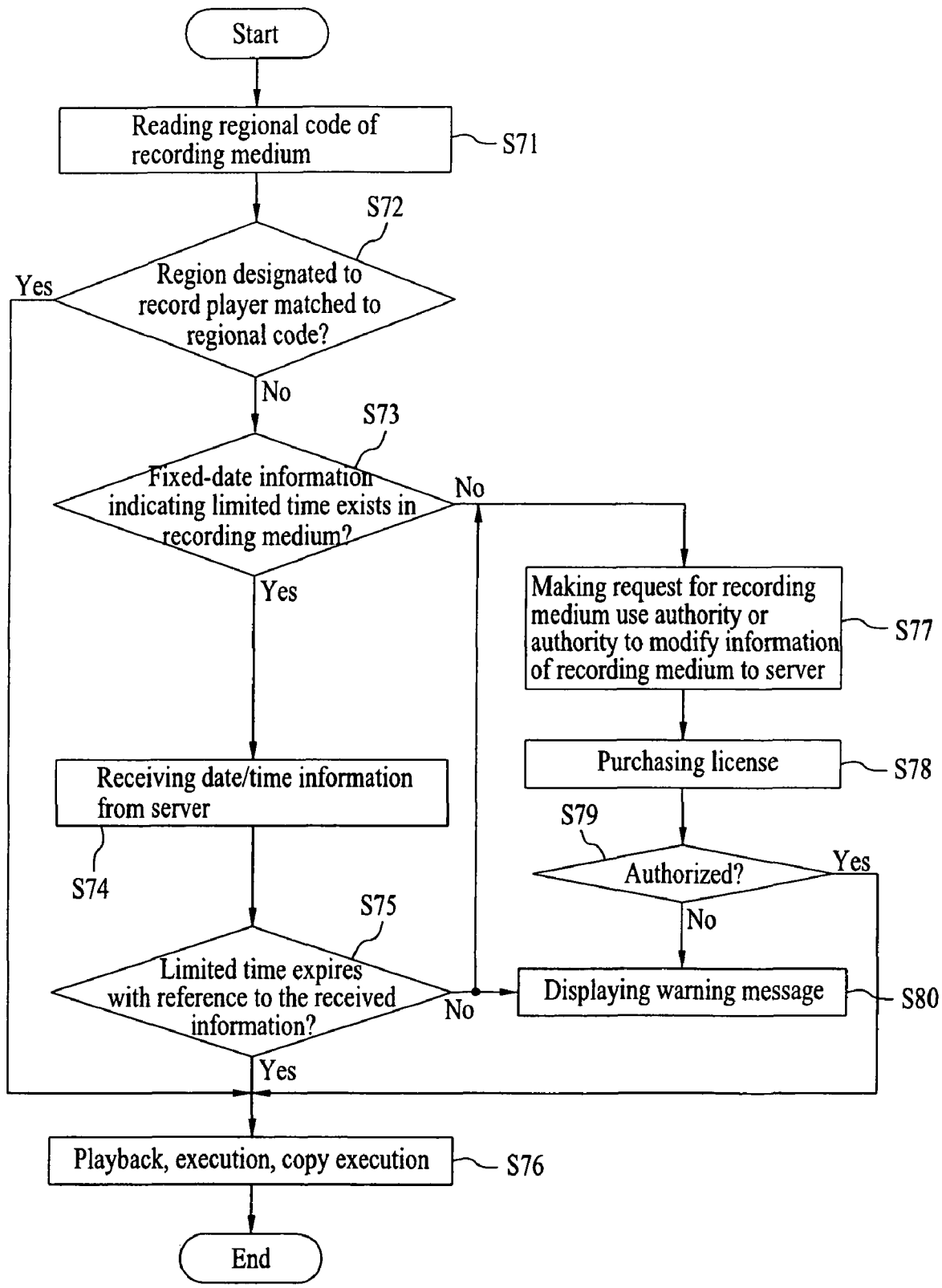
FIG. 12 is a flowchart of a method of reproducing data according to a further embodiment of the present invention.

FIG. 12 is a flowchart of a method of reproducing data according to a further embodiment of the present invention.

Referring to FIG. 12, if the recording medium 10 is loaded in the data record/reproduction apparatus 40 or if a user's command for instructing a playback is inputted, a pickup unit 401 reads at least one regional code included in an index table or object file and then transfers the read regional code to a control unit 402 (S71).

The control unit 402 compares the received regional code to regional information stored in the memory 404, and then decides whether a match exists (S72).

If a match exists, the control unit 402 performs the playback (reproduction) according to the user's command (S76).

On the other hand, if a match does not exist, the control unit 402 decides whether information indicating fixed-date information, for limiting the time of a non-permitted region/country reproduction, exists in the index table or object file of the recording medium 10 (S73).

If the fixed-date information exists in the recording medium 10, the control unit 402 receives RPC (remote procedure call) data including date (year/month/day) and time (hour/minute/second) from the server 50 and then stores the received RPC data in the PSR (S74). FIG. 13 shows an example of the PSR including the RPC data. The PSR, as shown in FIG. 13, includes the RPC data (2006-04-31 06:00:00 AM) and a region code.

The control unit 402 decides whether the fixed date has passed with reference to the date/time information included in the RPC data (S75). The control unit 402 can use a secured clock within the data record/reproduction apparatus 40 instead of using the RPC data. And, a user or application program is unable to change a date or time of the secured clock.

If the fixed date has passed, the control unit 402 performs the data reproduction even if the regional code included in the index table or the object file does not match to the region/country of the data record/reproduction apparatus 40 (S76).

If the fixed date has not passed, the control unit 402 displays a warning message (S80). If the fixed date has not passed, the control unit 402 transfers one of an ID and serial number of the recording medium 10 and an ID and serial number of the record/reproduction apparatus 40 to the server 50. And, the control unit 402 is able to make a request of the server 50 for authority to use the recording medium 10 or authority to change the regional code or fixed-date information of the recording medium (S77).

If the control unit 402 makes a request for the use authority or the information change authority, the server 50 transfers a message proposing a license purchase of data or information for billing of the license to the control unit 402 prior to granting the use authority or the information change authority. If a user of the record/reproduction apparatus 40 purchases the license with payment (S78), the server 50 grants the use authority or the information change authority to the user.

The control unit 402 decides whether the authority is granted to the user (S79). If the authority is granted to the user, the control unit 402 can reproduce the data of the recording medium 10 (S76). For instance, the corresponding data can be reproduced in a manner that the user or the control unit 402 deletes/changes the date/time information included in the fixed-date information or receives the regional information matching the regional code recorded in the recording medium 10. If the authority is not granted, the control unit 402 displays a warning message (S80).

In step S73, if the fixed-date information does not exist in the index table or the object file of the recording medium, the control unit 402 can make a request for authority to use the recording medium 10 or authority to change the regional code or fixed-date information of the recording medium to the server 50 (S77).

If the control unit 402 makes a request for the use authority or the information change authority, the server 50 transfers a message proposing a license purchase of data or information for billing of the license to the control unit 402 prior to granting the use authority or the information change authority. If a user of the record/reproduction apparatus 20 purchases the license with payment (S78), the server 50 grants the use authority or the information change authority to the user.

The control unit 402 decides whether the authority is granted to the user (S79). If the authority is granted to the user, the control unit 402 reproduces the data of the recording medium 10 (S76). If the authority is not granted, the control unit 402 displays a warning message (S80).

Third Embodiment

A method of reproducing data according to a third embodiment of the present invention is explained as follows.

Figure 14:
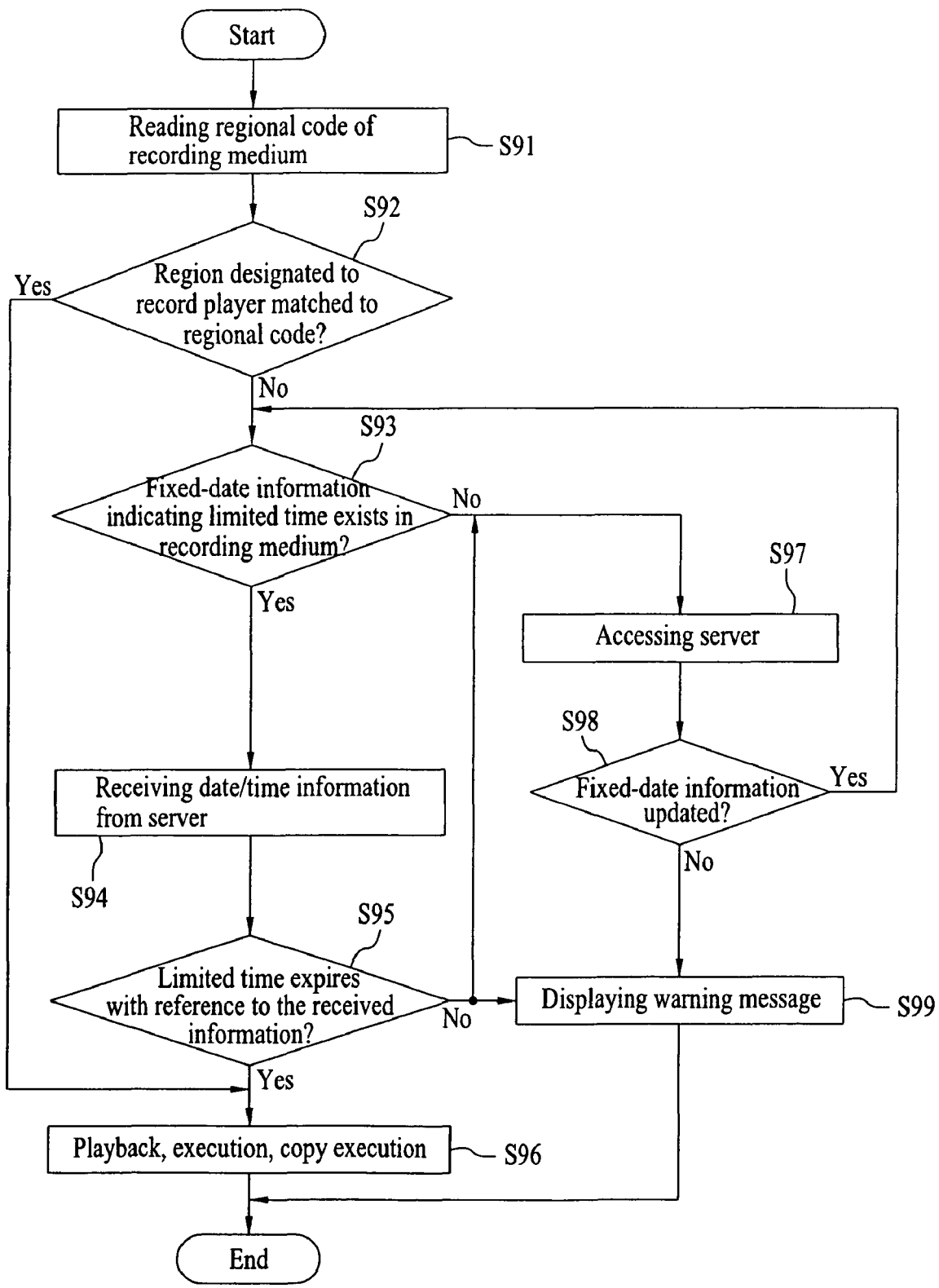
FIG. 14 is a flowchart of a method of reproducing data according to a still further embodiment of the present invention.

FIG. 14 is a flowchart of a method of reproducing data according to a still further embodiment of the present invention.

Referring to FIG. 14, if the recording medium 10 is loaded in the data record/reproduction apparatus 40 or if a user's command for instructing a playback is inputted, a pickup unit 401 reads at least one regional code included in an index table or object file and then transfers the read regional code to a control unit 402 (S91).

The control unit 402 compares the received regional code to regional information stored in the memory 404 and then decides whether the received regional code and the stored regional information match (S92).

If the received regional code and the stored regional information match, the control unit 402 plays an associated title according to a user's command, navigation command or Java application (S96).

On the other hand, if the received regional code does not match the stored regional code, the control unit 402 decides whether fixed-date information for limiting a time of a non-permitted region/country reproduction exists in the index table or object file of the recording medium 10 (S93).

If the fixed-date information exists in the recording medium 10, the control unit 402 receives RPC (remote procedure call) data including date (year/month/day) and time (hour/minute/second) from the server 50 (S94) and then decides whether the fixed-date has expired/passed with reference to the date/time information included in the RPC data (S95). The control unit 402 can use a secured clock within the data record/reproduction apparatus 40 instead of using the RPC data. And, a user or application program is unable to change a date or time of the secured clock.

If the fixed date has passed, the control unit 202 performs data reproduction even if the regional code included in the index table or the object file does not match to the region/country of the data record/reproduction apparatus 40 (S96).

If the fixed date has not passed, the control unit 402 accesses the server 50 and then receives a new object file including new fixed-date information. The control unit 402 stores the received new object file in the recording medium 10. Hence, the fixed-date information recorded in the recording medium 10 is updated or replaced by new fixed-date information.

Subsequently, the control unit 402 decides whether the fixed-date information is updated based on the stored new object file (S98).

If the fixed-date information is updated, the control unit 402 compares the updated fixed-date information to the date/time information included in the RPC data to decide whether the restriction is released (S93~S95). If the reproduction restriction of the data is released, the control unit 402 reproduces the corresponding data (S96). If the fixed-date information is not updated, the control unit 402 displays a warning message (S99).

In a method according to another embodiment of the present invention, if the recording medium 10 is loaded in the data record/reproduction apparatus or a user's command for instructing a playback is inputted, the control unit 402 accesses the server 50 to send a signal requesting a reproduction permission of data recorded in the recording medium 10. The control unit 402 is able to reproduce the data recorded in the recording medium 10 according to a reproduction permission signal or reproduction denial signal fed back from the server 50. For this, an address of the server 50, a command for instructing an access to the server 50 and the like are recorded in the recording medium 10.

In the above description, the data reproducing method is mainly explained. Yet, the technical idea of the present invention is applicable to a data recording method as well. For instance, in case of recording data in the recording medium 10, the data record/reproduction apparatus 20 or 40 generates a regional code based on the regional information stored in the memory 204 or 404 or the regional information transferred from the server 50 and then records the generated regional code in the index table or object file of the recording medium 10. The data record/reproduction apparatus 20 or 40 generates fixed-date information based on a time/date limit transferred from the server 50 and then records this fixed date in the recording medium 10.

Accordingly, the present invention provides at least one or more of the following effects or advantages.

Since data reproduction is restricted in a disapproved geographical region but is allowed in an approved geographical region only using a regional code recorded in a recording medium and regional information recorded in a record/reproduction apparatus, it is able to prevent data from being distributed to a place not specified by a copyright proprietor. Hence, a right of the copyright proprietor can be protected.

Second, a time can be set to prevent data from being reproduced during a copyright proprietor specific period in a disapproved geographical region using fixed-date information indicating a time limit on the restriction. A user is able to reproduce data with authentication of authorization through a server if necessary.

It will be apparent to those skilled in the art that various modifications and variations can be made in the present invention without departing from the spirit or scope of the inventions. Thus, it is intended that the present invention covers the modifications and variations of this invention provided they come within the scope of invention.

What is claimed is:

1. A recording medium having a data structure for managing reproduction of data, the recording medium comprising:
   a management area storing management information for reproducing the data, the management information including region information and time limit information, the region information indicating at least one geographic region in which reproduction of the data is permitted, the time limit information indicating a release time on which the geographic region restriction established by the region information expires.

2. The recording medium of claim 1, wherein the time limit information includes a date after which the geographic region restriction established by the region information expires.

3. The recording medium of claim 1, wherein the management information includes reproducing information indicating a playback of the data if the region information matches region information in a reproducing apparatus for reproducing the recording medium, and the reproducing information indicates a playback of the data if a present time exceeds the release time indicated by the time limit information.

4. A method of managing reproduction of data from a recording medium, comprising:
   determining, by a reproducing apparatus, reproduction of the data based on region information and time limit information, the region information indicating at least one geographic region in which reproduction of the data is permitted, the time limit information indicating a release time on which the geographic region restriction established by the region information expires;
   reproducing the data if the release time based on the time limit information has passed.

5. The method of claim 4, further comprising:
   prohibiting reproduction of data if the time limit information is not detected.

6. The method of claim 4, wherein the time limit information includes a date after which the geographic region restriction established by the region information expires.

7. The method of claim 4 further comprising:
   obtaining a present time; and
   reproducing the data if the present time is after the release time indicated by the time limit information.

8. The method of claim 7, wherein the obtaining step obtains the present time internally from the reproducing apparatus.

9. The method of claim 8, further comprising:
   storing the present time in a status register of the reproducing apparatus; and
   wherein the obtaining step obtains the present time from the status register.

10. The method of claim 8, further comprising:
    keeping time locally within the reproducing apparatus; and
    wherein the obtaining step obtains the present time from the kept local time.

11. The method of claim 7, wherein the obtaining step obtains the present time from a source external to the reproducing apparatus.

12. The method of claim 11, wherein the external source is a network server.

13. A method of managing reproduction of data from a recording medium by a reproducing apparatus, the method comprising:
    detecting if time limit information is recorded on the recording medium or if region information on the recording medium does not match region information stored at the reproducing apparatus, the time limit information indicating a release time on which a geographic region restriction established by the region information expires;
    prohibiting reproduction of data from the recording medium if the detecting step does not detect the time limit information; and
    permitting reproduction of the data if the release time has passed.

14. An apparatus for reproducing data from a recording medium, comprising:

a pick-up unit configured to reproduce data from the recording medium;

a memory configured to store region information indicating a geographic region; and a control unit configured to determine reproduction of the data based on region information and time limit information, the region information indicating at least one geographic region in which reproduction of the data is permitted, the time limit information indicating a release time on which the geographic region restriction established by the region information expires, and the control unit configured to control the pick-up unit to reproduce the data if the release time based on the time limit information has passed.

15. The apparatus of claim 14, wherein the control unit is configured to prohibit reproduction of the data if the time limit information is not detected.

16. The apparatus of claim 14, wherein the control unit is configured to obtain a present time, and store the present time in the memory.

* * * * *